US012619379B2

(12) United States Patent
Vishnoi et al.

(10) Patent No.: US 12,619,379 B2
(45) Date of Patent: May 5, 2026

(54) METHOD AND SYSTEM FOR PERFORMING DYNAMIC HOST MEMORY BUFFER (HMB) MANAGEMENT IN PCIe BASED DEVICES

(71) Applicant: SAMSUNG ELECTRONICS CO., LTD., Suwon-si (KR)

(72) Inventors: Suresh Vishnoi, Bengaluru (IN); Manoj Kumar Tangella, Bengaluru (IN); Rakesh Balakrishnan, Bengaluru (IN); Pradeep Sagar Ramachandra, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 18/416,512

(22) Filed: Jan. 18, 2024

(65) Prior Publication Data
US 2024/0402940 A1 Dec. 5, 2024

(30) Foreign Application Priority Data
May 30, 2023 (IN) .............................. 202341037382

(51) Int. Cl.
*G06F 3/06* (2006.01)
*G06F 13/42* (2006.01)
(52) U.S. Cl.
CPC ............ *G06F 3/0656* (2013.01); *G06F 3/061* (2013.01); *G06F 3/0679* (2013.01); *G06F 13/4221* (2013.01)
(58) Field of Classification Search
CPC ...... G06F 3/0626; G06F 3/0631; G06F 3/067; G06F 13/4221
See application file for complete search history.

(56) References Cited

U.S. PATENT DOCUMENTS

| | | |
|---|---|---|
| 10,613,778 B2 | 4/2020 | Hahn et al. |
| 11,403,011 B1 | 8/2022 | Gunda et al. |
| 2017/0351452 A1 | 12/2017 | Boyd et al. |

(Continued)

OTHER PUBLICATIONS

UNH-IOL NVMe Testing Service, "Test Plan for NVMe Conformance, Version 14.0, Target Specification: NVMe 1.4, Technical Document," Last Updated: Jul. 21, 2020, Total 287 pages.

(Continued)

*Primary Examiner* — Kalpit Parikh
(74) *Attorney, Agent, or Firm* — Sughrue Mion, PLLC

(57) ABSTRACT

There is provided a method and a controller for performing dynamic Host Memory Buffer (HMB) management in Peripheral Component Interconnect express (PCIe) based devices. The controller estimates a potential memory requirement for one or more memory intensive operations to be performed by the PCIe based device, transmits a first request to a host device associated with the PCIe based device, the first request indicating the potential memory requirement from Host Memory Buffer (HMB) of the host device, receives a plurality of memory allocation slots from the host device based on the first request, transmits a second request comprising HMB information related to current memory requirement based on the plurality of memory allocation slots to the host device and initializes memory of the HMB allocated to the controller based on the second request, for performing the at least one of the one or more memory intensive operations.

20 Claims, 6 Drawing Sheets

(56) References Cited

U.S. PATENT DOCUMENTS

| | | | | |
|---|---|---|---|---|
| 2019/0138220 A1* | 5/2019 | Hahn | .................... | G06F 3/0611 |
| 2019/0294350 A1* | 9/2019 | Hahn | .................... | G06F 3/0656 |
| 2020/0012595 A1* | 1/2020 | Bordia | .................. | G06F 3/0673 |
| 2023/0152988 A1 | 5/2023 | Lee et al. | | |
| 2023/0153215 A1* | 5/2023 | Wu | ....................... | G06F 3/0619 |
| | | | | 714/6.11 |

OTHER PUBLICATIONS

Communication issued on May 29, 2024 by the European Patent Office in counterpart European Application No. 24154992.2.

\* cited by examiner

FIG. 3

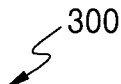

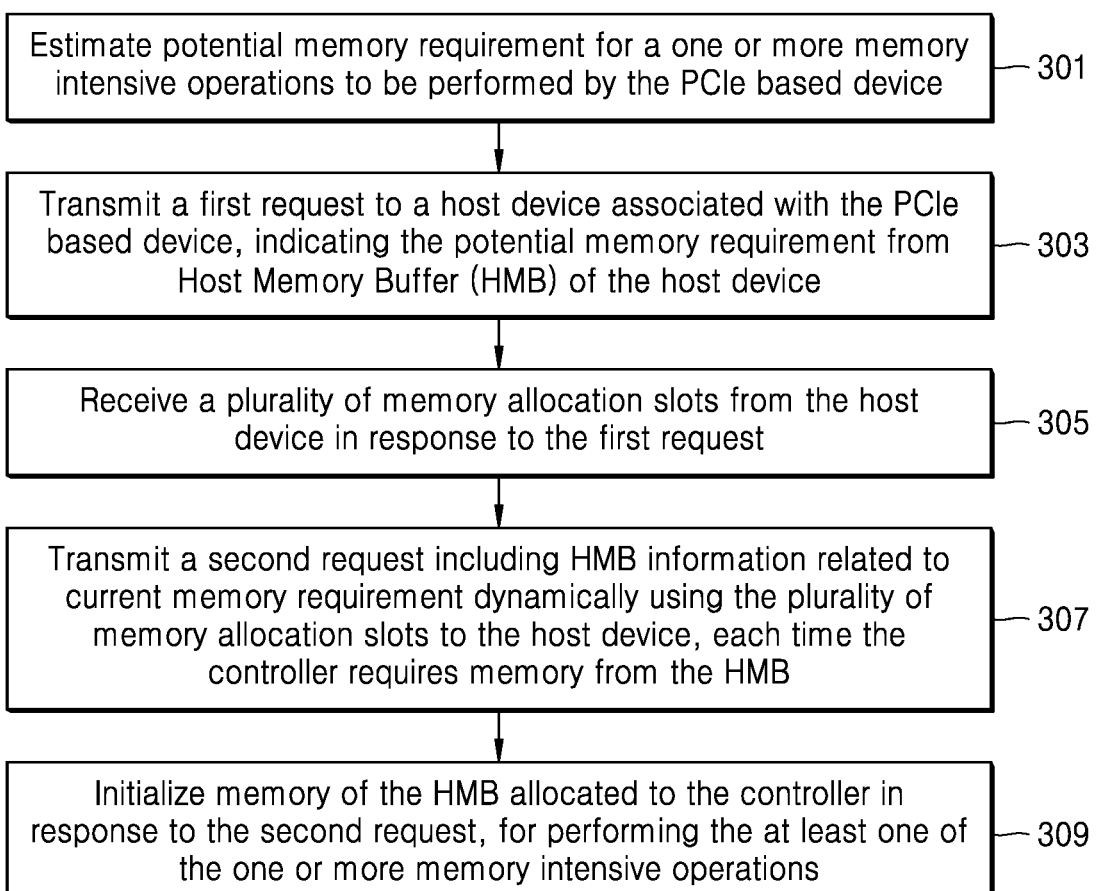

| | |
|---|---|
| Estimate potential memory requirement for a one or more memory intensive operations to be performed by the PCIe based device | — 301 |
| Transmit a first request to a host device associated with the PCIe based device, indicating the potential memory requirement from Host Memory Buffer (HMB) of the host device | — 303 |
| Receive a plurality of memory allocation slots from the host device in response to the first request | — 305 |
| Transmit a second request including HMB information related to current memory requirement dynamically using the plurality of memory allocation slots to the host device, each time the controller requires memory from the HMB | — 307 |
| Initialize memory of the HMB allocated to the controller in response to the second request, for performing the at least one of the one or more memory intensive operations | — 309 |

METHOD AND SYSTEM FOR PERFORMING DYNAMIC HOST MEMORY BUFFER (HMB) MANAGEMENT IN PCIe BASED DEVICES

CROSS-REFERENCE TO RELATED APPLICATION

This application is based on and claims priority from Indian Patent Application No. 202341037382 filed on May 30, 2023, in the Indian Intellectual Property Office, the disclosure of which is incorporated by reference herein in its entirety.

BACKGROUND

1. Field

The disclosure relates to Peripheral Component Interconnect express (PCIe) based devices, and in particular, to a method and system for performing dynamic Host Memory Buffer (HMB) management in the PCIe based devices.

2. Description of Related Art

A Host Memory Buffer (HMB) is a memory portion present in a host device, which is used by Peripheral Component Interconnect express (PCIe) based devices. In the PCIe based devices, the controller of the PCIe based devices uses the HMB instead of an onboard limited memory to enhance performance of the PCIe based devices. However, in the related art methods using storage protocols like Non-Volatile Memory express (NVMe), the HMB allocation is static, which means that the required HMB is allocated only once during the boot time of the PCIe based device and freed by the host device once the session is completed.

Further, in the related art methods, deallocation of the HMB takes place when the host device determines that the HMB should be freed or when the host device requires the allocated memory to perform operations of the host device. Therefore, when the host device sends an instruction to the PCIe based device regarding deallocation, the PCIe based device may terminate operations that are being performed using the allocated memory of the HMB and remove data from the allocated memory of the HMB. Thereafter, the host device deallocates the memory of the HMB that was initially allocated to the PCIe based device. This poses a challenge for the PCIe based device as it may have to free the memory upon receiving the instructions from the host device, leading to delays in completing operations of the PCIe based device or termination of the operations due to lack of memory. Moreover, in the related art methods, the PCIe based device does not have any means to communicate with the host device to free the allocated memory of the HMB when the PCIe based device has completed its operations and does not require the allocated memory of the HMB any longer. This leads to a scenario, in which, even though the memory is not being used by the PCIe based device, a part of the HMB memory is held up at the PCIe based device until the host device sends a deallocation request to the PCIe based device. Accordingly, in the related art systems, the HMB is not being used optimally, and the controller is unable to use the HMB for event-based throughput enhancement without affecting the currently loaded HMB data.

The information disclosed in this background section is only for enhancement of understanding of the general background of the invention and should not be taken as an acknowledgement or any form of suggestion that this information forms the prior art already known to a person skilled in the art.

SUMMARY

According to an aspect of the disclosure, there is provided a method of performing dynamic Host Memory Buffer (HMB) management in a Peripheral Component Interconnect express (PCIe) based device including a controller, the method including: estimating a potential memory requirement for one or more memory intensive operations to be performed by the PCIe based device; transmitting a first request to a host device associated with the PCIe based device, the first request indicating the potential memory requirement from a Host Memory Buffer (HMB) of the host device; receiving a plurality of memory allocation slots from the host device based on the first request; transmitting a second request including HMB information related to a current memory requirement to dynamically use the plurality of memory allocation slots to the host device each time the controller requires memory from the HMB; and initializing a memory of the HMB allocated to the PCIe based device based on the second request, for performing the at least one of the one or more memory intensive operations.

The one or more memory intensive operations may include prefetching, specific application's pattern-based improvement, background migration, flash operations, Garbage Collection (GC) migration and any product's host memory-based operations for optimization and functionality.

The HMB information may be stored in an array data structure.

The HMB information may include at least one of, an "enabled" field, an "in-use" field, an HMB size, an HMB preferred size, an HMB maximum size, an HMB minimum size, priority to free a memory, an approximate duration to hold a memory for performing at least one of the one or more memory intensive operations and an HMB memory descriptor list.

The method may further include receiving the plurality of memory allocation slots transmitted by the host device through one of a get feature command, a get log page command and a first command customized as per customer requirement.

The method may further include allocating the memory of the HMB to the controller based on the second request; and deallocating the memory of the HMB from the controller based on a third request, wherein the second request and the third request communicated through one of a set feature command and a second command customized as per customer requirement.

The method may further include transmitting, to the host device, a third request including the HMB information related to dynamically deallocate the memory of the HMB used to perform at least one of the one or more memory intensive operations, wherein the third request is transmitted to the host device upon voluntarily removing data from the memory of the HMB or prior to removal of the data from the memory of the HMB.

When the third request is transmitted prior to the removal of the data from the memory of the HMB, receiving a confirmation from the host device to remove the data from the memory of the HMB based on the third request; and removing the data from the memory of the HMB based on the confirmation from the host device.

The method may further include upon completion of the removal of the data from the memory of the HMB, deallocating the memory of the HMB, by the host device, based on the HMB information related to deallocation of the memory of the HMB.

According to an aspect of the disclosure, there is provided an apparatus for performing dynamic Host Memory Buffer (HMB) (107) management in a Peripheral Component Interconnect express (PCIe) based device, the apparatus including: a controller; and a memory, communicatively coupled to the controller, and storing instructions, which when executed by the controller cause the controller to: estimate a potential memory requirement for one or more memory intensive operations to be performed by the PCIe based device; transmit a first request to a host device associated with the PCIe based device, the first request indicating the potential memory requirement from a Host Memory Buffer (HMB) of the host device; receive a plurality of memory allocation slots from the host device based on the first request; transmit a second request including HMB information related to current memory requirement to dynamically use the plurality of memory allocation slots to the host device; and initialize a memory of the HMB allocated to the controller based on the second request, for performing the at least one of the one or more memory intensive operations.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. An example embodiment of system and/or methods in accordance with embodiments of the present subject matter are now described, by way of example only, and regarding the accompanying figures, in which:

FIG. 3 shows a flowchart illustrating a method of performing dynamic Host Memory Buffer (HMB) management in a Peripheral Component Interconnect express (PCIe) based devices, in accordance with an example embodiment of the disclosure.

Figure 1:
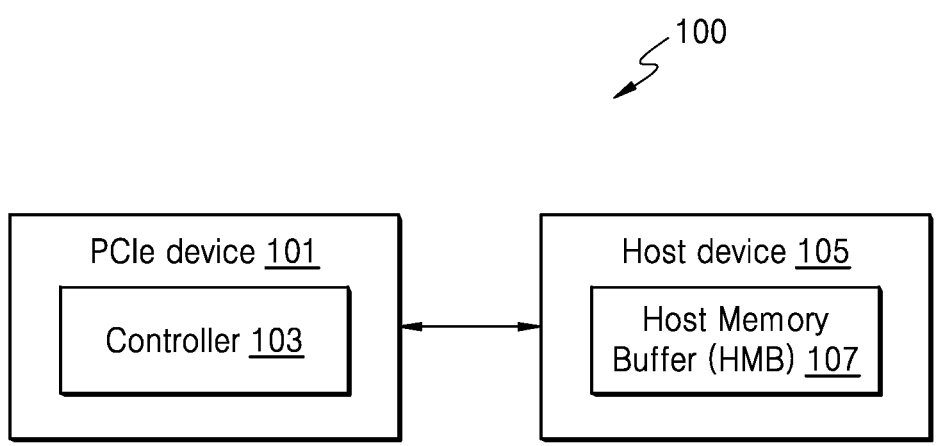
FIG. 1 shows an illustration of communication between a PCIe based device and a Host device, in accordance with an example embodiment of the disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In this disclosure, the term "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

FIG. 1 shows an illustration of communication between a PCIe based device and a host device, in accordance with an example embodiment of the disclosure.

According to an example embodiment, a Peripheral Component Interconnect express (PCIe) based device 101 may include a controller 103 configured to perform dynamic Host Memory Buffer (HMB) 107 management. As an example, the PCIe based device 101 may be a graphics adapter cards, a Network Interface Card (NIC), storage accelerator devices, Solid State Drive (SSD) expansion cards, sound cards, storage controller cards, Redundant Array of Independent Disks (RAID) controller, video capture cards and the like. According to an example embodiment, a controller 103 of the PCIe based device 101 and/or processor may perform dynamic HMB 107 management. According to an example embodiment, the devices may be connected to a host device 105 using PCIe. As an example, the host device 105 may be a computing device such as a Personal Computer (PC) and the like. However the disclosure is not limited thereto, and as such, according to another example embodiment, the computing device may include other electronic devices.

According to an example embodiment, the controller 103 of the PCIe based device 101 may estimate potential memory requirement for one or more memory intensive operations to be performed by the PCIe based device 101. Here, the potential memory requirement may be an estimated memory requirement for one or more memory intensive operations to be performed by the PCIe based device 101. The one or more memory intensive operations may include, without limitation, prefetching, specific application's pattern-based improvement, background migration, flash operations, Garbage Collection (GC) migration and any product's host memory-based operations for optimization and functionality. As an example, the PCIe based device 101 may require a total of 10 Gigabytes (GB) of memory for performing the one or more memory intensive operations.

According to an example embodiment, upon estimating the potential memory requirement, the controller 103 may transmit a first request to a host device 105 associated with the PCIe based device 101, indicating the potential memory requirement from Host Memory Buffer (HMB) 107 of the host device 105. According to an example embodiment, the PCIe based device 101 may transmit the first request using an Asynchronous Event Request (AER).

According to an example embodiment, upon transmitting the first request to the host device 105, the controller 103 may be receive a plurality of memory allocation slots from the host device 105 in response to the first request. For example, based on to the first request, the controller 103 may receive a plurality of memory allocation slots from the host device 105. According to an example embodiment, the host device 105 may allocate the plurality of memory allocation slots to the controller 103 to enable the controller 103 to dynamically request for the desired amount of host memory for performing the one or more memory intensive operations by sending HMB information. For example, the controller 103 may dynamically request for the desired amount of host memory every time the one or more memory intensive operations is performed. According to an example embodiment, based on the first request, the plurality of memory allocation slots may be transmitted by the host device 105 to the controller 103. For example, in response to the first request, the plurality of memory allocation slots may be transmitted by the host device 105 to the controller 103 through a command. According to an example embodiment, the command may include, but is not limited to, a get feature command, a get log page command or a first command customized as per customer requirement. The response to the first request may be based on the PCIe based device 101 and configuration of a vendor of the host device 105.

According to an example embodiment, upon receiving the plurality of memory allocation slots, the controller 103 may transmit a second request including HMB information related to current memory requirement using the plurality of memory allocation slots to the host device 105. According to an example embodiment, the plurality of memory allocation slots to the host device 105 may be dynamically used by the controller in sending the second request. For example, each time the controller 103 requires memory from the HMB 107, the controller 103 may transmit a second request including HMB information related to current memory requirement and dynamically use the plurality of memory allocation slots to the host device 105. According to an example embodiment, the PCIe based device 101 may transmit the second request using the AER. According to an example embodiment, the HMB information may be stored in an array data structure. The HMB information may include, without limitation, at least one of, an "enabled" field, an "in-use" field, an HMB size, an HMB preferred size, an HMB maximum size, an HMB minimum size, priority to free a memory, an approximate duration to hold a memory for performing at least one of the one or more memory intensive operations and an HMB memory descriptor list. According to an exemplary scenario, the PCIe based device 101 may require memory to perform a prefetching operation and the controller 103 of the PCIe based device 101 may transmit the second request to the host device 105. At the same time, if the PCIe based device 101 may require memory to perform a background migration, the controller 103 may send the second request again to the host device 105. That is, the controller 103 may send another second request to the host device 105. The memory allotted to perform prefetching operation may not be affected as the controller 103 may have requested the memory indicating the potential memory requirement from the host device 105.

According to an example embodiment, upon transmitting the second request, the controller 103 may be configured to initialize memory of the HMB allocated to the controller 103 in response to the second request, for performing the at least one of the one or more memory intensive operations. For example, the controller 103 may initialize a memory of the HMB allocated to the controller 103 based on to the second request. According to an example embodiment, in response to the second request, the memory of the HMB 107 may be allocated to the controller 103, by the host device 105, through one of a set feature command or a second command customized as per customer requirement. The response to the second request may be based on the PCIe based device 101 and configuration of a vendor of the host device 105. According to an example embodiment, the host device 105 may reserve the memory for the at least one of the one or more memory intensive operations. Upon initializing the memory of the HMB 107, the controller 103 may use the memory of the HMB allocated to perform the at least one of the one or more memory intensive operations.

According to an example embodiment, upon the completion of the one or more memory intensive operations, the controller 103 may transmit, to the host device 105, a third request including the HMB information related to deallocation of the memory of the HMB 107 used to perform at least one of the one or more memory intensive operations, where the at least one of the one or more memory intensive operations was performed by dynamically using the plurality of memory allocation slots. According to an example embodiment, the PCIe based device 101 may transmit the third request using the AER. According to an example embodiment, the controller 103 may transmit the third request to the host device 105, each time the controller 103 requires deallocation of the memory of the HMB 107. Accordingly, the controller 103 may dynamically free up memory of the HMB 107 for use by succeeding or future one or more memory intensive operations. According to an example embodiment, the third request may be transmitted to the host device 105 upon voluntarily removing data from the memory of the HMB 107. Upon completion of the removal of the data from the memory of the HMB 107, the memory of the HMB 107 is deallocated by the host device 105 based on the HMB information related to deallocation of the memory of the HMB 107.

In an example embodiment, the third request may be transmitted to the host device 105 prior to removal of the data from the memory of the HMB 107. According to an example embodiment, the controller 103 may receive a confirmation from the host device 105 to remove the data from the memory of the HMB 107, in response to the third request. Upon receiving the confirmation from the host device 105, the controller 103 may remove the data from the memory of the HMB 107. Upon completion of the removal of the data from the memory of the HMB 107, the memory of the HMB 107 is deallocated by the host device 105 based on the HMB information related to deallocation of the memory of the HMB 107.

In an example embodiment, the host device 105 may deallocate by itself the memory of the HMB 107 used by the controller 103 to perform at least one of the one or more memory intensive operations when the host device 105 requires the memory allocated to the controller 103. For example, when the controller 103 is performing the at least one of the one or more memory intensive operations, the host device 105 may require the memory, and based on the requirement for the memory, the host device 105 may deallocate the memory. According to an example embodiment, the host device 105 may deallocate the memory and inform or request the controller 103 to remove the data stored in the allocated memory.

Figure 2:
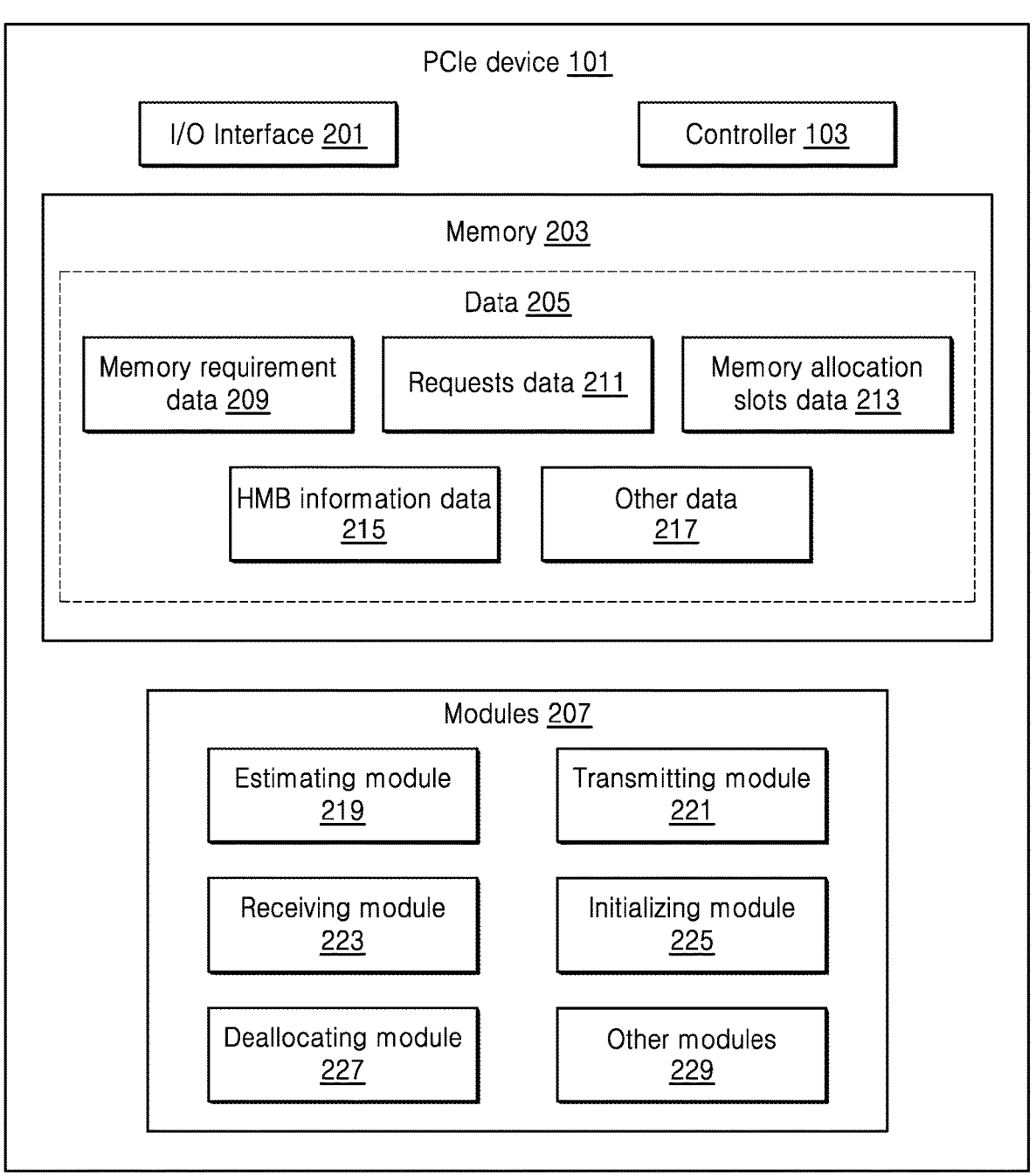
FIG. 2 shows a detailed block diagram of a Peripheral Component Interconnect express (PCIe) device, in accordance with an example embodiment of the disclosure.

FIG. 2 shows a detailed block diagram of a Peripheral Component Interconnect express (PCIe) based device 101, in accordance with an example embodiment of the disclosure.

According to an example embodiment, the PCIe based device 101 may include an I/O interface 201, a controller 103 and a memory 203. According to an example embodiment, the memory 203 may be communicatively coupled to the controller 103. The controller 103 may be configured to perform one or more functions of the PCIe based device 101 for performing dynamic Host Memory Buffer (HMB) 107 management, using the data 205 and the one or more modules 207 of the PCIe based device 101. According to an example embodiment, the memory 203 may store data 205.

According to an example embodiment, the data 205 stored in the memory 203 may include, without limitation, a memory requirement data 209, a requests data 211, a memory allocation slots data 213, a HMB information data 215 and other data 217. According to an example embodiment, the data 205 may be stored within the memory 203 in the form of various data structures. Additionally, the data 205 may be organized using data models, such as relational or hierarchical data models. The other data 217 may include various temporary data and files generated by the one or more modules 207.

According to an example embodiment, the memory requirement data 209 may include memory requirement to perform one or more memory intensive operations by the PCIe based device 101. The one or more memory intensive operations may include, without limitation, prefetching, specific application's pattern-based improvement, background migration, flash operations and Garbage Collection (GC) migration and any product's host memory-based operations for optimization/functionality. According to an example embodiment, the memory requirement data 209 may be transmitted to a host device 105 to indicate a potential memory requirement to perform the one or more memory intensive operations by the controller 103.

According to an example embodiment, the requests data 211 may include the information related to a first request, a second request and third request transmitted by the controller 103 to the host device 105. According to an example embodiment, the first request may indicate the potential memory requirement from Host Memory Buffer (HMB) of the host device 105. According to an example embodiment, the second request may include HMB information related to current memory requirement. According to an example embodiment, the third request may include the HMB information related to deallocation of the memory of the HMB used to perform at least one of the one or more memory intensive operations. The HMB information provides an insight on amount of memory to be allocated to the controller 103 and corresponding parameters during allocation and amount of memory to be deallocated and corresponding parameters during deallocation. According to an example embodiment, the first request, the second request and the third request may be transmitted by the PCIe based device 101. The requests data 211 may also include the information related to response received in response to the first request, the second request and the third request. According to an example embodiment, the PCIe based device 101 may transmit the first request, the second and the third request using an Asynchronous Event Request (AER).

According to an example embodiment, the memory allocation slots data 213 may include information related to the memory slots allotted by the host device 105 in response to the first request from the controller 103. The host device 105 may allocate the memory slots based on the potential memory requirement for the one or more memory intensive operations. According to an example embodiment, the controller 103 may use the memory allocation slots data 213, which indicates information related to the memory slots allotted by the host device 105, to perform the at least one of the one or more memory intensive operations.

According to an example embodiment, the HMB information data 215 may include information related to current memory requirement by the controller 103. The HMB information data 215 may be transmitted with the second request to the host device 105. The HMB information data 215 may include, without limitation, at least one of, an "enabled" field, an "in-use" field, an HMB size, an HMB preferred size, an HMB maximum size, an HMB minimum size, priority to free a memory, an approximate duration to hold memory for performing at least one of the one or more memory intensive operations and an HMB memory descriptor list. According to an example embodiment, the "enabled" field may indicate if the host device 105 has already set the memory. The "in-use" field may indicate if the memory is in use by the controller 103. The HMB size is the size of an HMB memory allocated by the host device 105. The HMB preferred size is the size of the HMB memory preferred by the host device 105. The HMB maximum size is the maximum HMB memory requested by the controller 103. The HMB minimum size is the minimum HMB memory requested by the controller 103. The priority to free a memory is the priority based on which the host device 105 can deallocate the HMB memory. The duration field may indicate duration required by the controller 103 to perform at least one of the one or more memory intensive operations. According to an example embodiment, the HMB information data 215 may be transmitted each time the controller 103 requires memory allocation for each of the one or more memory intensive operations. According to an example embodiment, the controller 103 may also transmit the HMB information data 215 to the host device 105 when the controller 103 deallocates the memory used to perform the at least one of the memory intensive operations.

According to an example embodiment, the data 205 may be processed by the one or more modules 207 of the PCIe based device 101. According to an example embodiment, the one or more modules 207 may be communicatively coupled to the controller 103 for performing one or more functions of the PCIe based device 101. According to an example embodiment, the one or more modules 207 may include, without limiting to, an estimating module 219, a transmitting module 221, a receiving module 223, an initializing module 225, a deallocating module 227 and other modules 229.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 207 may be configured as stand-alone hardware computing units. According to an example embodiment, the other modules 229 may be used to perform various miscellaneous functionalities on the PCIe based device 101. It will be appreciated that such one or more modules 207 may be represented as a single module or a combination of different modules. According to an example embodiment, the other modules 229 may include one or more other modules configured to perform other operations of the PCIe based device alone or in cooperation with the estimating module 219, the transmitting module 221, the receiving module 223, the initializing module 225, and the deallocating module 227.

According to an example embodiment, the estimating module 219 may be configured to estimate potential memory requirement for one or more memory intensive operations to be performed by the PCIe based device 101. The estimating module 219 estimates the potential memory requirement at booting time of the host device 105. The one or more memory intensive operations may include, without limitation, prefetching, specific application's pattern-based improvement, background migration, flash operations and Garbage Collection (GC) migration and any product's host memory-based operations for optimization/functionality.

According to an example embodiment, the transmitting module 221 may be configured to transmit a first request to a host device 105 associated with the PCIe based device 101, indicating the potential memory requirement from Host Memory Buffer (HMB) 107 of the host device 105. The transmitting module 221 may also be configured to transmit a second request including HMB information related to current memory requirement dynamically using the plurality of memory allocation slots to the host device 105, each time the controller 103 requires memory from the HMB 107. Further, the transmitting module 221 may also be configured to transmit a third request including the HMB information related to deallocation of the memory of the HMB 107 used to perform at least one of the one or more memory intensive operations, where the at least one of the one or more memory intensive operations was performed dynamically using the plurality of memory allocation slots, to the host device 105, each time the controller 103 requires deallocation of the memory of the HMB 107. Accordingly, the controller 103 may dynamically free up memory of the HMB 107 for use by succeeding or future one or more memory intensive operations.

According to an example embodiment, the receiving module 223 may be configured to receive a plurality of memory allocation slots from the host device 105 in response to the first request. The receiving module 223 may also be configured to receive a confirmation from the host device 105 to remove the data from the memory of the HMB 107, in response to the third request.

According to an example embodiment, the initializing module 225 may be configured to initialize memory of the HMB allocated to the controller 103 in response to the second request, for performing the at least one of the one or more memory intensive operations. Upon initializing the memory, the controller 103 may utilize the memory to perform at least one of the one or more memory intensive operations.

According to an example embodiment, the deallocating module 227 may be configured to deallocate the memory of the HMB 107 used to perform at least one of the one or more memory intensive operations dynamically using the plurality of memory allocation slots. Upon completion of the at least one of the one or more memory intensive operations the deallocating module 227 may be configured to remove the data from the memory of the HMB 107. According to an example embodiment, the deallocating module 227 may receive a third request including the HMB information related to deallocation of the memory of the HMB 107 used to perform at least one of the one or more memory intensive operations. According to an example embodiment, the third request may be transmitted to the host device 105 upon voluntarily removing data from the memory of the HMB 107. In some other example embodiments, the third request may be transmitted to the host device 105 prior to removal of the data from the memory of the HMB 107. When the third request is transmitted to the host device 105 prior to removal of the data from the memory of the HMB 107, the deallocating module 227 may receive a confirmation from the host device 105 to remove the data from the memory of the HMB 107, in response to the third request. Further, the deallocating module 227 may remove the data from the memory of the HMB 107, in response to the confirmation from the host device 105. Upon removing the data from the memory of the HMB 107, the deallocating module 227 may notify the host device 105, and the host device 105 may then deallocate the memory of the HMB 107 from which the data is removed. Once the memory of the HMB 107 is deallocated, the host device 105 may use the memory of the HMB 107 for a different allocation request received from the controller 103 or for operations of the host device 105.

FIG. 3 shows a flowchart illustrating a method of performing dynamic Host Memory Buffer (HMB) 107 management in a Peripheral Component Interconnect express (PCIe) based device 101, in accordance with an example embodiment of the disclosure.

As illustrated in FIG. 3, the method 300 may include one or more blocks illustrating a method of performing dynamic Host Memory Buffer (HMB) 107 management in a Peripheral Component Interconnect express (PCIe) based device 101 using the PCIe based device 101 illustrated in FIG. 2. The one or more blocks may illustrate one or more operations corresponding to the method of performing dynamic HMB 107 management. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

In operation 301, the method 300 may include estimating, by a controller 103 of the PCIe based device 101, potential memory requirement for a one or more memory intensive operations to be performed by the PCIe based device 101.

The one or more memory intensive operations may include, without limitation, prefetching, specific application's pattern-based improvement, background migration, flash operations, Garbage Collection (GC) migration and any product's host memory-based operations for optimization and functionality.

In operation 303, the method 300 may include transmitting, by the controller 103, a first request to a host device 105 associated with the PCIe based device 101, indicating the potential memory requirement from Host Memory Buffer (HMB) 107 of the host device 105.

In operation 305, the method 300 may include receiving, by the controller 103, a plurality of memory allocation slots from the host device 105 in response to the first request. According to an example embodiment, the plurality of memory allocation slots may be transmitted by the host device 105 to the controller 103, in response to the first request through one of a get feature command, a get log page command or a first command customized as per customer requirement.

In operation 307, the method 300 may include transmitting, by the controller 103, a second request including HMB information related to current memory requirement dynamically using the plurality of memory allocation slots to the host device 105, each time the controller 103 requires memory from the HMB 107. According to an example embodiment, the HMB information may be stored in an array data structure. According to an example embodiment, the HMB information may include, without limitation, at least one of, an "enabled" field, an "in-use" field, an HMB size, an HMB preferred size, an HMB maximum size, an HMB minimum size, priority to free a memory, an approximate duration to hold a memory for performing at least one of the one or more memory intensive operations and an HMB memory descriptor list.

In operation 309, the method 300 may include initializing, by the controller 103, memory of the HMB allocated to the controller 103 in response to the second request, for performing the at least one of the one or more memory intensive operations. According to an example embodiment, the memory of the HMB 107 is allocated to the controller 103 and deallocated from the controller 103, by the host device 105, in response to the corresponding second request and a third request, through one of a set feature command or a second command customized as per customer requirement. According to an example embodiment, each time the controller 103 requires deallocation of the memory of the HMB 107, the controller 103 may transmit, to the host device 105, a third request including the HMB information related to deallocation of the memory of the HMB 107 used to perform at least one of the one or more memory intensive operations, where the at least one of the one or more memory intensive operations was performed dynamically using the plurality of memory allocation slots. Accordingly, the controller 103 may dynamically free up memory of the HMB 107 for use by succeeding or future one or more memory intensive operations. According to an example embodiment, the third request is transmitted to the host device 105 upon voluntarily removing data from the memory of the HMB 107 or prior to removal of the data from the memory of the HMB 107. According to an example embodiment, when the controller 103 receives a confirmation from the host device 105 to remove the data from the memory of the HMB 107, in response to the third request the controller 103 removes the data from the memory of the HMB 107, in response to the confirmation from the host device 105. According to an example embodiment, upon completion of the removal of the data from the memory of the HMB 107, the memory of the HMB 107 is deallocated by the host device 105 based on the HMB information related to deallocation of the memory of the HMB 107.

Figure 4A:
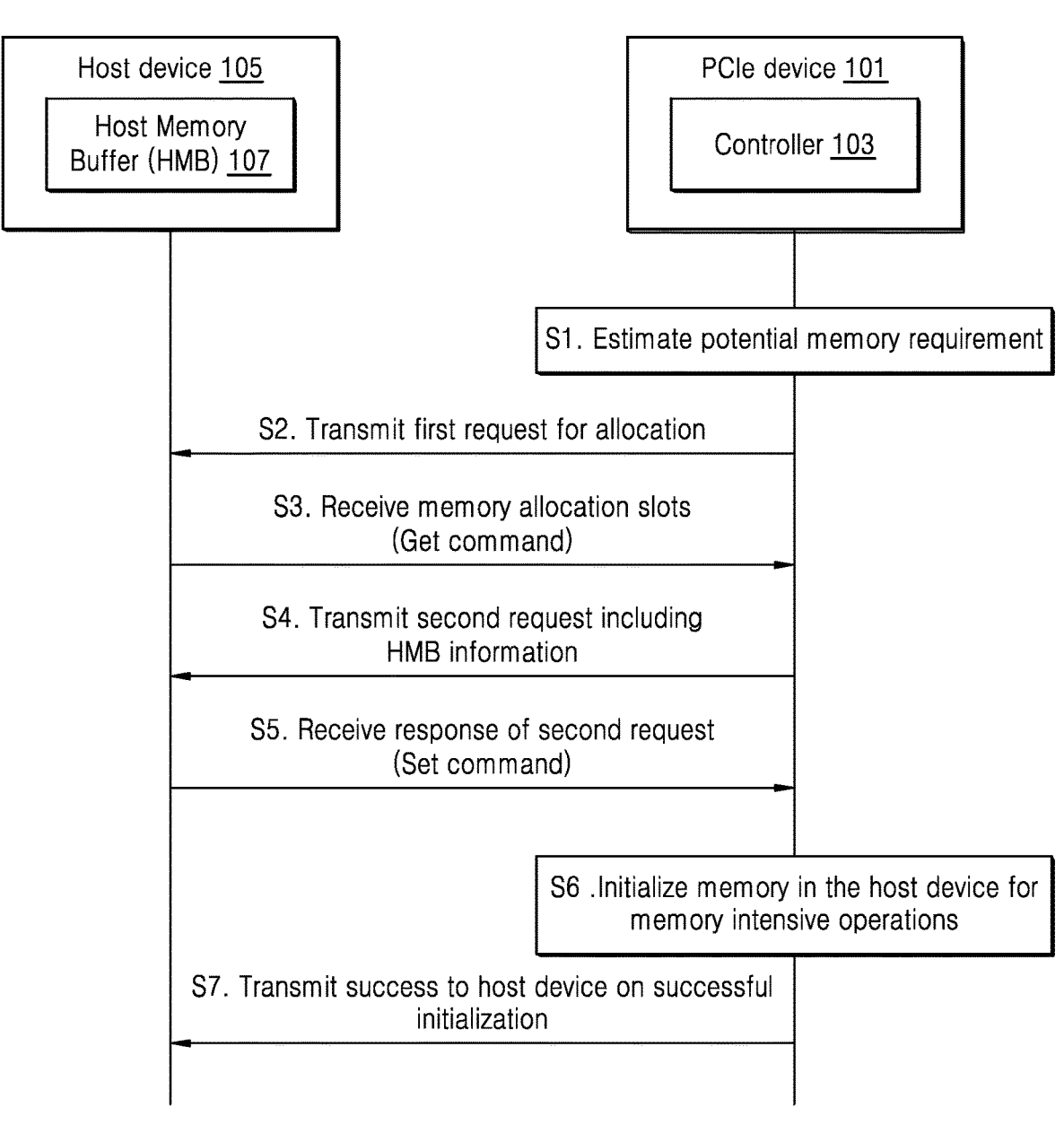
FIG. 4A shows a sequence diagram illustrating an exemplary memory allocation between Peripheral Component Interconnect express (PCIe) based device and host device.

FIG. 4A shows a sequence diagram illustrating an exemplary memory allocation between Peripheral Component Interconnect express (PCIe) based device and host device.

According to an example embodiment, the controller 103 of a Peripheral Component Interconnect express (PCIe) based device 101 may estimate potential memory requirement to perform one or more memory intensive operations (S1). Upon estimating the memory requirement, the controller 103 may transmit a first request to a host device 105 associated with the PCIe based device 101 (S2), indicating the potential memory requirement from Host Memory Buffer (HMB) 107 of the host device 105. As an example, the controller 103 may request for seven slots to be allotted to perform the one or more memory intensive operations. According to an example embodiment, the host device 105 is informed regarding the potential memory requirement by the PCIe based device 101. Consequently, the controller 103 may receive a plurality of memory allocation slots from the host device 105 in response to the first request (S3). As an example, the response of the first request may be one of a get feature command, a get log page command or a first command customized as per customer requirement. When the PCIe based device 101 may require the HMB 107 to perform at least one of the one or more memory intensive operations, the controller 103 may transmit a second request including HMB information related to current memory requirement dynamically using the plurality of memory allocation slots to the host device 105, each time the controller 103 requires memory from the HMB 107 (S4). As an example, the HMB information may contain the below exemplary values based on the requirement of the one or more memory intensive operations:

(HMB ID, Slot 0)
    Enabled: 0
    in-use: 0
    HMB size: 0
    HMB preferred size: 64 Megabytes (MB)
    HMB maximum size: 128 MB
    HMB 107 minimum size: 32 MB
    Priority to free memory: NULL
    Approximate duration to hold memory: NULL
    HMB memory descriptor list: NULL According to an example embodiment, the controller 103 may receive a response to the second request from the host device 105 (S5). As an example, the response of the second request may be one of a set feature command or a second command customized as per customer requirement. As an example, the HMB information received in response to the second request may contain the below exemplary values:

(HMB ID, Slot 0)
      Enabled: 1
      in-use: 0
      HMB size: 64 Megabytes (MB)
      HMB preferred size: 64 Megabytes (MB)
      HMB maximum size: 128 MB
      HMB 107 minimum size: 32 MB
      Priority to free memory: NULL
      Approximate duration to hold memory: NULL
      HMB memory descriptor list: Physical address of the
        memory allocated by the host device 105

Upon receiving the response to the second request, the controller 103 may utilize the memory to perform the at least one of the memory intensive operations. According to an example embodiment, the controller 103 may initialize a memory of the HMB allocated to the controller 103 in response to the second request, for performing the at least one of the one or more memory intensive operations (S6). The in-use field in the HMB information may be changed to "1" when the memory is used by the controller 103. According to an example embodiment, the controller 103 may transmit success to the host device 105 to indicate that the initialization was successful (S7). The process of transmitting the first request till initializing the memory may be performed each time the controller 103 may require the memory from the HMB 107 of the host device 105.

Figure 4B:
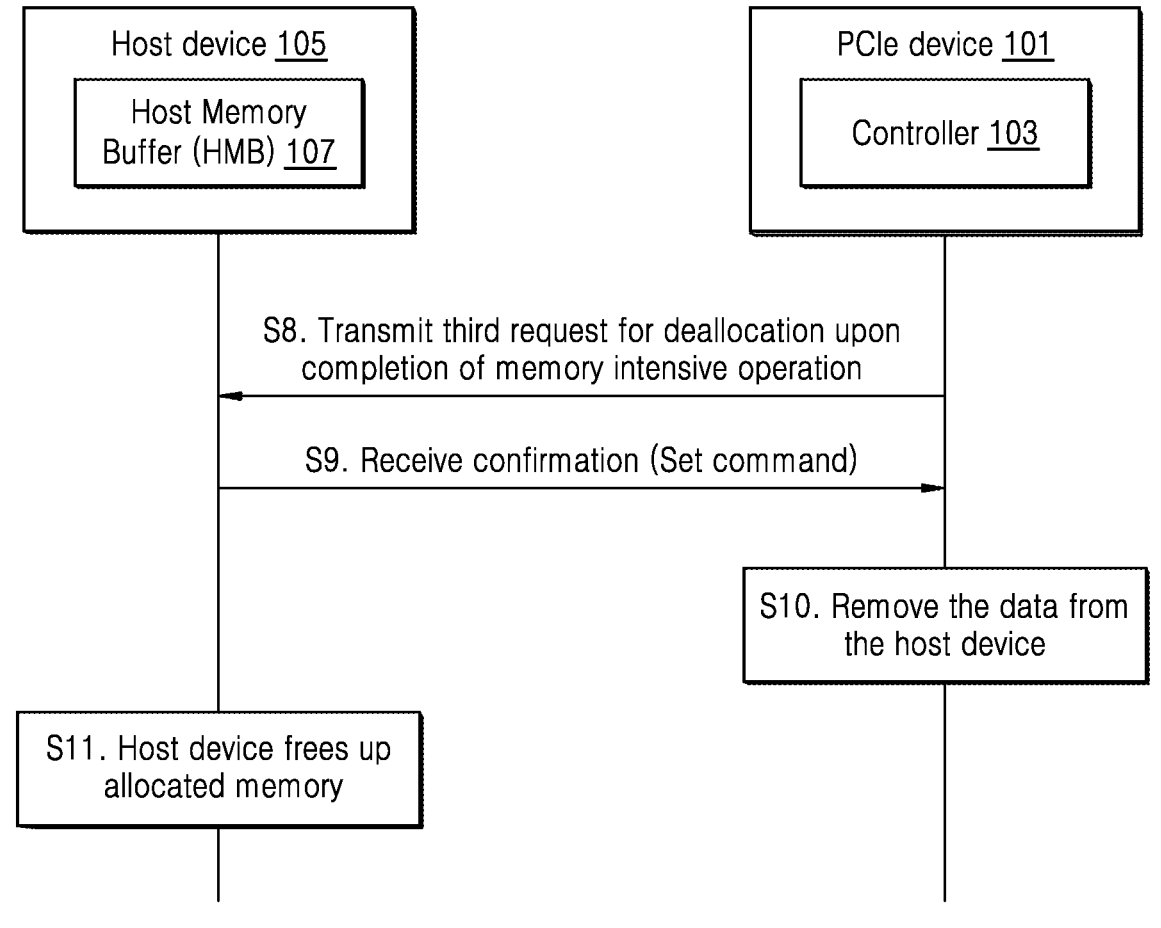
FIG. 4B shows a sequence diagram illustrating an exemplary memory deallocation between Peripheral Component Interconnect express (PCIe) based device and host device.

FIG. 4B shows a sequence diagram illustrating an exemplary memory deallocation between Peripheral Component Interconnect express (PCIe) based device and host device.

According to an example embodiment, upon completion of the task, the controller 103 may transmit, to the host device 105, a third request including the HMB information related to deallocation of the memory of the HMB 107 used to perform at least one of the one or more memory intensive operations, where the at least one of the one or more memory intensive operations was dynamically using the plurality of memory allocation slots (S8). Upon transmitting the request, the controller 103 may receive a confirmation from the host device 105 to remove the data from the memory of the HMB 107, in response to the third request (S9). As an example, the HMB information received in response to the third request may contain the below exemplary values:

(HMB ID, Slot 0)
    Enabled: 0
    in-use: 0
    HMB size: 64 Megabytes (MB)
    HMB preferred size: 64 Megabytes (MB)
    HMB maximum size: 128 MB
    HMB 107 minimum size: 32 MB
    Priority to free memory: NULL
    Approximate duration to hold memory: NULL
    HMB memory descriptor list: Physical address of the
        memory allocated by the host device 105

According to an example embodiment, the controller 103 may remove the data from the memory of the HMB 107, in response to the confirmation from the host device 105 (S10). Upon completion of the removal of the data from the memory of the HMB 107, the memory of the HMB 107 is deallocated by the host device 105 based on the HMB information related to deallocation of the memory of the HMB 107 (S11).

Figure 5:
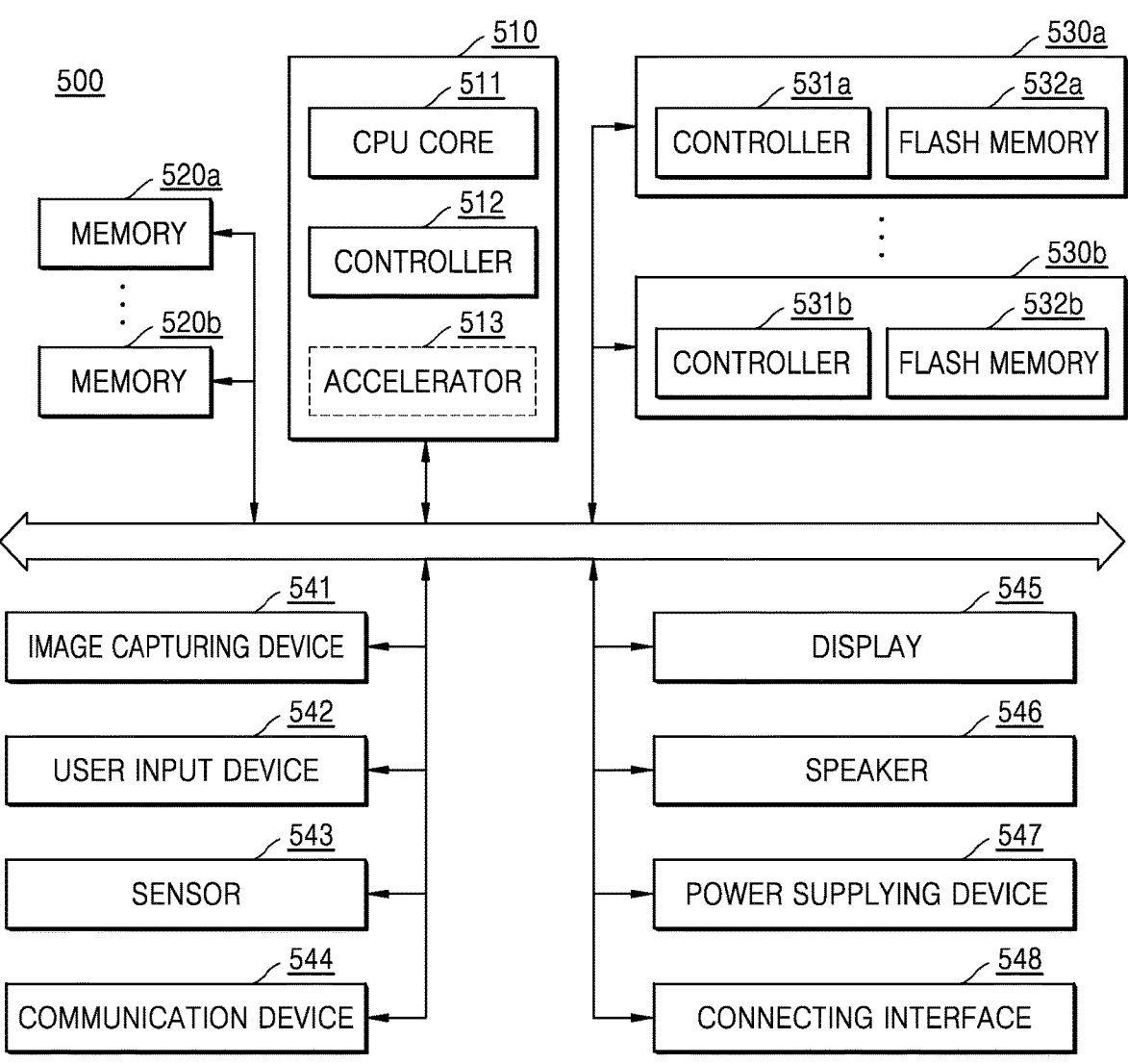
FIG. 5 illustrates a general computing system architecture, in accordance with an example embodiment of the disclosure.

FIG. 5 is a general diagram of a system 500 to which a Peripheral Component Interconnect express (PCIe) based device is connected, according to an example embodiment of the disclosure. In an example embodiment, the system 500 may be a host device 105 explained in the context of the disclosure. According to an example embodiment, the system 500 of FIG. 5 may be a mobile system, such as a portable communication terminal (e.g., a mobile phone), a smartphone, a tablet personal computer (PC), a wearable device, a healthcare device, or an Internet of things (IOT) device. However, the system 500 of FIG. 5 is not necessarily limited to the mobile system and may be a PC, a laptop computer, a server, a media player, or an automotive device (e.g., a navigation device).

Referring to FIG. 5, system 500 may include a main processor 510, memories (e.g., 520a and 520b), and storage devices (e.g., 530a and 530b). In addition, the system 500 may include at least one of an image capturing device 541, a user input device 542, a sensor 543, a communication device 544, a display 545, a speaker 546, a power supplying device 547, and a connecting interface 548.

According to an example embodiment, the main processor 510 may control all operations of the system 500. For example, the main processor 510 may control operations of other components included in the system 500. The main processor 510 may be implemented as a general-purpose processor, a dedicated processor, or an application processor.

The main processor 510 may include at least one CPU core 511, and a controller 512 configured to control the memories 520a to 520b and/or the storage devices 530a to 530b. In an example embodiment, the main processor 510 may further include an accelerator 513, which is a dedicated circuit for a high-speed data operation, such as an artificial intelligence (AI) data operation. The accelerator 513 may include a graphics processing unit (GPU), a neural processing unit (NPU) and/or a data processing unit (DPU) and be implemented as a chip that is physically separate from the other components of the main processor 510.

The memories 520a to 520b may be used as main memory devices of the system 500. Although each of the memories 520a to 520b may include a volatile memory, such as static random access memory (SRAM) and/or dynamic RAM (DRAM), each of the memories 520a to 520b may include non-volatile memory, such as a flash memory, phase-change RAM (PRAM) and/or resistive RAM (RRAM). Memories 520a to 520b may be implemented in the same package as the main processor 510.

The storage devices 530a and 530b may serve as non-volatile storage devices configured to store data regardless of whether power is supplied thereto and have larger storage capacity than the memories 520a to 520b. The storage devices 530a and 530b may respectively include storage controllers (STRG CTRL) and NVM (Non-Volatile Memory) 532a and 532b configured to store data via the control of the storage controllers 531a and 531b. Although the NVMs 532a and 532b may include flash memories having a two-dimensional (2D) structure or a three-dimensional (3D) V-NAND structure, the NVMs may include other types of NVMs, such as PRAM and/or RRAM.

The storage devices 530a and 530b may be physically separated from the main processor 510 and included in the system 500 or implemented in the same package as the main processor 510. In addition, the storage devices 530a and 530b may have types of solid-state devices (SSDs) or memory cards and be removably combined with other components of the system 500 through an interface, such as the connecting interface 548 that will be described below. The storage devices 530a and 530b may be devices to which a standard protocol, such as a universal flash storage (UFS), an embedded multi-media card (eMMC), or a non-volatile memory express (NVMe), is applied, without being limited thereto.

The image capturing device 541 may capture still images or moving images. The image capturing device 541 may include a camera, a camcorder, and/or a webcam.

The user input device 542 may receive various types of data input by a user of the system 500 and include a touch pad, a keypad, a keyboard, a mouse, and/or a microphone.

The sensor 543 may detect various types of physical quantities, which may be obtained from the outside of the system 500 and convert the detected physical quantities into electric signals. The sensor 543 may include a temperature sensor, a pressure sensor, an illuminance sensor, a position sensor, an acceleration sensor, a biosensor, and/or a gyroscope sensor.

The communication device 544 may transmit and receive signals between other devices outside the system 500 according to various communication protocols. The communication device 544 may include an antenna, a transceiver, and/or a modem.

The display 545 and the speaker 546 may serve as output devices configured to respectively output visual information and auditory information to the user of the system 500.

The power supplying device 547 may appropriately convert power supplied from a battery (not shown) embedded in the system 500 and/or an external power source and supply the converted power to each of components of the system 500.

The connecting interface 548 may provide connection between the system 500 and an external device, which is connected to the system 500 and capable of transmitting and receiving data to and from the system 500. The connecting interface 548 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to an example embodiment, there is provided a method for estimating the potential memory requirement and transmitting request to the host device indicating the potential memory requirement. In this manner, the host device is aware of the potential memory requirement at the boot time and accordingly provide a plurality of memory allocation slots which enables the controller to dynamically request for desired amount of host memory for performing the memory intensive operations.

According to an example embodiment, the method further includes transmitting a request using an Asynchronous Event Request (AER) to allocate the memory each time memory is required for performing one or more memory intensive operations. In this manner, the memory is dynamically allocated, and as such, the controller may be able to perform one or more memory intensive operations using the dynamically allocated memory even after the boot time.

According to an example embodiment, the method further includes deallocating the memory of the HMB used by the controller to perform one or more memory intensive operations upon completion of the operation. In this manner, the method dynamically utilizes the memory by making the memory available for the next one or more memory intensive operations.

As stated above, it shall be noted that the method according to one or more embodiments of the disclosure may be used to overcome various technical problems related to performing dynamic Host Memory Buffer (HMB) management in a Peripheral Component Interconnect express (PCIe) based devices. In other words, the method according to one or more embodiments of the disclosure has a practical application and provides a technically advanced solution to the technical problems associated with the existing approach into dynamic Host Memory Buffer (HMB) management in the PCIe based device.

In light of the technical advancements provided by the method according to one or more embodiments of the disclosure, the operation of the method as discussed above, are not routine, conventional, or well-known aspects in the art, as the operations provide the aforesaid solutions to the technical problems existing in the related art technologies. Further, the operations clearly bring an improvement in the functioning of the system itself, as the operations provide a technical solution to a technical problem.

The terms "an embodiment", "embodiment", "embodiments", "the embodiment", "the embodiments", "one or more embodiments", "an example embodiment", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of performing dynamic Host Memory Buffer (HMB) management in a Peripheral Component Interconnect express (PCIe) based device including a controller, the method comprising:

estimating a potential memory requirement for one or more memory intensive operations to be performed by the PCIe based device;

transmitting a first request to a host device associated with the PCIe based device, the first request indicating the potential memory requirement from a Host Memory Buffer (HMB) of the host device;

receiving a plurality of memory allocation slots from the host device based on the first request;

transmitting a second request comprising HMB information related to a current memory requirement to dynamically use the plurality of memory allocation slots to the host device each time the controller requires memory from the HMB; and initializing a memory of the HMB allocated to the PCIe based device based on the second request, for performing the at least one of the one or more memory intensive operations, wherein the HMB information comprises:

a first information indicating whether a first slot allocated by the host device, among the plurality of memory allocation slots, is enabled, and a second information indicating whether the first slot allocated by the host device, among the plurality of memory allocation slots, is in use.

2. The method as claimed in claim 1, wherein the one or more memory intensive operations comprises at least one of prefetching, pattern-based improvement of an application, background migration, flash operations, Garbage Collection (GC) migration and host memory-based operations of a product for optimization and functionality.

3. The method as claimed in claim 1, wherein the HMB information is stored in an array data structure.

4. The method as claimed in claim 3, wherein the HMB information comprises at least one of, an "enabled" field corresponding to the first information, an "in-use" field corresponding to the second information, an HMB size, an HMB preferred size, an HMB maximum size, an HMB minimum size, priority to free a memory, an approximate duration to hold a memory for performing at least one of the one or more memory intensive operations and an HMB memory descriptor list.

5. The method as claimed in claim 1, further comprises:

receiving the plurality of memory allocation slots transmitted by the host device through one of a get feature command, a get log page command and a command customized as per customer requirement.

6. The method as claimed in claim 1, further comprises:

allocating the memory of the HMB to the controller based on the second request; and deallocating the memory of the HMB from the controller based on a third request, wherein the second request and the third request communicated through one of a set feature command and a command customized as per customer requirement.

7. The method as claimed in claim 1, further comprises:

transmitting, to the host device, a third request comprising the HMB information related to dynamically deallocate the memory of the HMB used to perform at least one of the one or more memory intensive operations, wherein the third request is transmitted to the host device upon voluntarily removing data from the memory of the HMB or prior to removal of the data from the memory of the HMB.

8. The method as claimed in claim 7 comprises, when the third request is transmitted prior to the removal of the data from the memory of the HMB, receiving a confirmation from the host device to remove the data from the memory of the HMB based on the third request; and removing the data from the memory of the HMB based on the confirmation from the host device.

9. The method as claimed in claim 7, further comprising:

upon completion of the removal of the data from the memory of the HMB, deallocating the memory of the HMB, by the host device, based on the HMB information related to deallocation of the memory of the HMB.

10. The method as claimed in claim 1, wherein the method further comprises:

updating, by the controller, the second information to indicate that the first slot is in use, and transmitting third information to the host device indicating that the initialization was successful.

11. An apparatus for performing dynamic Host Memory Buffer (HMB) management in a Peripheral Component Interconnect express (PCIe) based device, the apparatus comprising:

a controller; and a memory, communicatively coupled to the controller, and storing instructions, which when executed by the controller cause the controller to:

estimate a potential memory requirement for one or more memory intensive operations to be performed by the PCIe based device;

transmit a first request to a host device associated with the PCIe based device, the first request indicating the potential memory requirement from a Host Memory Buffer (HMB) of the host device;

receive a plurality of memory allocation slots from the host device based on the first request;

transmit a second request comprising HMB information related to current memory requirement to dynamically use the plurality of memory allocation slots to the host device; and initialize a memory of the HMB allocated to the controller based on the second request, for performing the at least one of the one or more memory intensive operations, wherein the HMB information comprises:

a first information indicating whether a first slot allocated by the host device, among the plurality of memory allocation slots, is enabled, and a second information indicating whether the first slot allocated by the host device, among the plurality of memory allocation slots, is in use.

12. The apparatus as claimed in claim 11, wherein the one or more memory intensive operations comprises at least one of prefetching, pattern-based improvement of an application, background migration, flash operations, Garbage Collection (GC) migration and host memory-based operations of a product for optimization and functionality.

13. The apparatus as claimed in claim 11, wherein the HMB information is stored in an array data structure.

14. The apparatus as claimed in claim 13, wherein the HMB information comprises at least one of, an "enabled" field corresponding to the first information, an "in-use" field corresponding to the second information, an HMB size, an HMB preferred size, an HMB maximum size, an HMB minimum size, priority to free a memory, an approximate duration to hold a memory for performing at least one of the one or more memory intensive operations and an HMB memory descriptor list.

15. The apparatus as claimed in claim 11, wherein the controller is further configured to receive the plurality of memory allocation slots transmitted by the host device through one of a get feature command, a get log page command or a command customized as per customer requirement.

16. The apparatus as claimed in claim 11, wherein the memory of the HMB is allocated to the controller by the host device based on the second request and deallocated from the controller by the host device based on, a third request, wherein the second request and the third request communicated through one of a set feature command or a command customized as per customer requirement.

17. The apparatus as claimed in claim 11, wherein the controller is further configured to:

transmit, to the host device, a third request comprising the HMB information related to dynamically deallocate the memory of the HMB used to perform at least one of the one or more memory intensive operations, wherein the third request is transmitted to the host device upon voluntarily removing data from the memory of the HMB or prior to removal of the data from the memory of the HMB.

18. The apparatus as claimed in claim 17 comprises, when the third request is transmitted prior to the removal of the data from the memory of the HMB, the controller is configured to:

receive a confirmation from the host device to remove the data from the memory of the HMB based on the third request; and remove the data from the memory of the HMB based on to the confirmation from the host device.

19. The apparatus as claimed in claim 17, wherein upon completion of the removal of the data from the memory of the HMB, the memory of the HMB is deallocated by the host device based on the HMB information related to deallocation of the memory of the HMB.

20. The apparatus as claimed in claim 11, wherein the controller is further configured to:

update, by the controller, the second information to indicate that the first slot is in use, and transmit third information to the host device indicating that the initialization was successful.

\* \* \* \* \*